United States Patent [19]

Kanada et al.

[11] Patent Number: 4,773,007
[45] Date of Patent: Sep. 20, 1988

[54] COMPLIER CODE OPTIMIZATION METHOD FOR A SOURCE PROGRAM HAVING A FIRST AND SECOND ARRAY DEFINITION AND USE STATEMENTS IN A LOOP

[75] Inventors: Yasusi Kanada, Tokyo; Kazuhisa Ishida, Yokohama, both of Japan

[73] Assignee: Hitachi, Ltd., Tokyo, Japan

[21] Appl. No.: 15,018

[22] Filed: Feb. 17, 1987

[30] Foreign Application Priority Data

Mar. 7, 1986 [JP] Japan .................................. 61-48309

[51] Int. Cl.$^4$ ............................................... G06F 5/00
[52] U.S. Cl. .................................................. 364/300
[58] Field of Search ... 364/200 MS File, 900 MS File, 364/300

[56] References Cited

U.S. PATENT DOCUMENTS

| | | | |
|---|---|---|---|
| 4,374,408 | 2/1983 | Bowles et al. | 364/200 |
| 4,567,574 | 1/1986 | Saadé et al. | 364/900 |
| 4,642,765 | 2/1987 | Cocke et al. | 364/300 |
| 4,667,290 | 5/1987 | Goss et al. | 364/300 |

OTHER PUBLICATIONS

Takanuki et al., "Some Compiling Algorithms for an Array Processor," 3rd USA-Japan Computer Conference, (1978), pp. 273-279.
Kuck et al., "Dependence Graphs and Compiler Optimizations," 8th Conference on Principles of Programing Languages, ACM (1981), pp. 207-218.
Aho et al., "More About Data-Flow Analysis," in: Aho et al., Principles of Compiler Design (Addison-Wesly, 1977), pp. 478-480.
Tremblay et al., "Code Optimization," in: Tremblay et al., The Theory and Practice of Computer Writing (New York, 1985), pp. 610-631, QA76.6.T734.
Aho et al., "Code Optimization," in: Aho et al., Compilers Principles, Techniques, and Tools (Massachusetts, Reading, 1986), pp. 585-605, QA76.76.C-65A37.

Primary Examiner—Raulfe B. Zache
Assistant Examiner—Robert B. Harrell
Attorney, Agent, or Firm—Antonelli, Terry & Wands

[57] ABSTRACT

A dataflow analysis processing of a compiler is executed when a loop of a source program includes a first array definition statement determining a value of an element of an array and an array use statement using the value of the element of the array. Whether or not a second array definition statement exists in a path from the first array definition statement to the array use statement in the program and whether or not the second array definition statement may possibly rewrite the value of the array defined by the first array definition statement are judged by comparing the subscripts associated with the array definition and the array use. For a pair of each array definition statement and each array use statement, a step for generating array definition/use relationship data from the first array definition statement to the array use statement only when the possibility of the rewriting is present. In the program transformation processing, the program transformation processing is achieved only when the array definition/use relationship data contains only an array definition/use relationship for which the result of the program execution is not changed by the program transformation.

2 Claims, 9 Drawing Sheets

```
          401
DO 10 I = 1,10
   IF (C) THEN    ··· 411
      A(I) = V    ··· d1
   ELSE IF
      A(I) = W    ··· d2
   END IF         ··· 412
   X = A(I)       ··· u
   A(I+1) = X     ··· d3
10  CONTINUE
```

FIG. 8
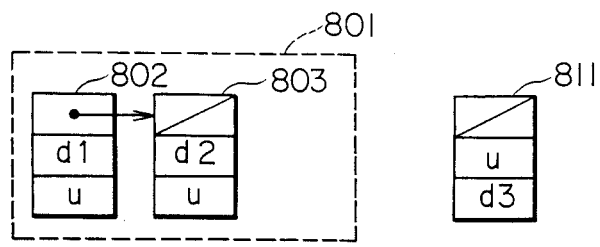
FIG. 9
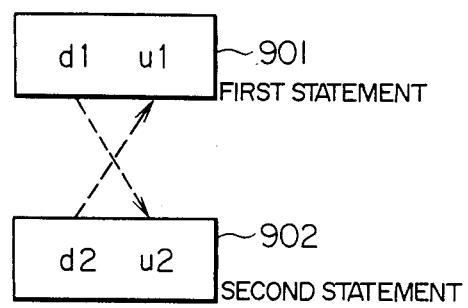
FIG. 10
```
                1001
   DO 10 I = 1, 10
      IF (C) THEN
         A(I) = V      ···d1
      ELSE IF
         A(I) = W      ···d2
      END IF
      X = A(I)         ···u
10 CONTINUE
   A(11) = X           ···d3
```

COMPILER CODE OPTIMIZATION METHOD FOR A SOURCE PROGRAM HAVING A FIRST AND SECOND ARRAY DEFINITION AND USE STATEMENTS IN A LOOP

BACKGROUND OF THE INVENTION

The present invention relates to a program translation method for compiling a source program of a computer language into an object program.

A procedure for translating a program in a FORTRAN compiler is represented as shown in FIG. 2. Namely, a lexical/syntax analysis is conducted on a source program 201 to transform the source program into a first program 203 of an intermediate language suitable for the processing of the compiler (step 202), and then an optimization is accomplished on the first program 203 of the intermediate language so as to increase the execution performance of the object program thereof, thereby generating a second program 205A of the intermediate language (step 204A). Thereafter, the second program 205A of the intermediate language is translated into an object program 207A executable in a computer (step 206).

The optimization processing 204A is achieved as briefly illustrated in FIG. 3. That is, a control flow analysis processing (step 301) is first executed to obtain control flow data 305 representing the sequence of execution of the components included in the intermediate language program 203 (step 301). Next, a dataflow analysis processing is executed to obtain, by use of the control flow data 305, dataflow data 306A representing the relationships between definitions and uses of variables (step 302A). Thereafter, a program transformation processing is executed to transform the intermediate language program 203 by use of the control flow data 305 and the dataflow data 306A and to output an intermediate language program 205A corresponding to the object program 207A having an improved execution efficiency.

As a kind of the dataflow data 306, there exist data of relationships between definitious and uses of (simple) variables and arrays (i.e. reaching definitions, ud-chains, du-chains, flow dependences, and the like).

A method for analyzing the relationship between definitions and codes of variables has been described in the following reference (1).

(1) Aho, Ullman: Principles of Compiler Design, Addison-Wesly (1977), pp. 478–480.

A method for analyzing the control flow has also been described in the reference (1).

On the other hand, a method for analyzing the relationships between definitions and uses of arrays has been described in reference (2).

(2) 3rd USA-Japan Computer Conference, pp. 273–279 (1978).

In addition, a method for transforming a program by use of the data of relationships between definitions and uses (flow dependences) has been described in the following reference (3).

(3) 8th Conference on Principles of Programming Languages, Association for Computing Machinery, pp. 207–218 (1981).

The method of the reference (1) above for analyzing the definition/use relationships is a method associated with variables; however, this method cannot be applied to the definition/use relationships of array references because of the following reason. Namely, although a reference to a variable at a point of a program always indicates a fixed address, a reference to an array element at a point of a program indicates an address which changes depending on a subscript thereof.

On the other hand, the method of the reference (2) for analyzing the definition/use relationship is a method associated with array references; however, this method is attended with a disadvantage that when a loop includes a conditional statement, an appropriate dataflow data essential for the optimization cannot be attained in some cases.

The disadvantage will be described by use of FIG. 4. The diagram illustrates a program 401 written in FORTRAN. This source program can be transformed or vectorized into an object program executable in a supercomputer such as Cray-1, S-810 of Hitachi, or the like, which enables to execute the program at a speed considerably higher than that developed in a general purpose computer. This is because the program 401 does not include a definition/use relationship unsuitable for the vectorization, namely, which cannot be vectorized without changing the result of the program execution.

The definition/use relationship not suitable for the vectorization will be here described with reference to FIG. 10. Assume that there exist a first statement including a first definition d1 of an array or a variable and a first use u1 thereof and a second statement 902 including a second definition d2 of an array or a variable and a second use d2 thereof and that there exist a definition/use relationship from the first definition d1 to the second use u2 and a definition/use relationship from the second definition d2 to the first use u1. With such cyclic definition/use relationships, even when the statements in a loop are arbitrarily reordered, the result of the execution of the vectorized program cannot be matched with that of the original program, which has been well known and has been discussed in the reference (3).

In the program 401, the problem to be solved to determine whether or not the vectorization is applicable is the relationship between the array definition statement d3 and the array use statement u. Namely, if the value of data defined by the array definition statement d3 is used by the array use statement u, there appears a cyclic definition/use relationship and the program is hence unsuitable for a vectorization, namely, the program cannot be transformed into a program executable in a supercomputer. However, since the value of data defined by the array definition statement d3 is changed by use of the array definition statements d1 and d2, it is not possible that the value is used by the array use statement u. Consequently, the program 401 does not contain a definition/use relationship unsuitable for the vectorization.

However, according to the analysis method of the definition/use relationships described in the reference (2), the relationship between the array definition statement d3 and the array use statement u is assumed to be unsuitable for the vectorization, and hence the program 401 cannot be subjected to a vectorization. The relationship is regarded as unsuitable for the vectorization because of the following reason. According to the analysis method of the definition/use relationships described in the reference (2), when the relationship between the array definition statement d3 and the array use statement u is checked, the presence or absence of the definition/use relationship is judged only by comparing the subscripts of the array definition and the array use.

Namely, the array definition statement d1 and the array definition statement d2 are not taken into consideration. As a result, the value of data defined by the array definition statement d3 is assumed to be possibly used by the array use statement u. However, this relationship is not suitable for the vectorization.

If the definition/use relationships are checked for a program with a DO loop not having a conditional statement or such a statement effectively similar thereto, the appropriate definition/use relationships can be attained through a relatively easy procedure for examining the subscripts of the array definition statements other than the array definition statement for which the relationship is to be determined. However, if a conditional statement is contained like in the case of the program 401, this procedure cannot be used to determine the relationship. This is because the following two cases cannot be discriminated.

The first case is a case like the program 401. That is, in all paths from the first step of the DO loop to the array use statement to be subjected to the judgment of the definition/use relationship, namely, in the case of the program 401, there exists an array definition statement having a subscript I in the path passing THEN side of the conditional control structure from the IF statement 411 to the END IF statement 412, which passes the array definition statement d1 and in the path passing ELSE side of the conditional control structure, which passes the array definition statement d2; consequently, the value of data defined by the array definition statement d3 does not reach the array use statement u.

In contrast, the second case includes a path not having an array definition statement, and hence the value of the data defined by the array definition statement actually reaches the array use statement. For example, in a program generated by removing the array definition statement d2 from the program 401, the value defined by the array definition statement d3 reaches the array use statement u.

SUMMARY OF THE INVENTION

It is therefore an object of the present invention to provide a program translation method in which the appropriate array definition/use relationships can be attained in a DO loop including a conditional statement or a control structure similar thereto like in the program 401, thereby enabling a program transformation such as a vectorization and obtaining an object program having a higher performance.

The problem described above can be solved, in a case where in a dataflow analysis processing 302 of a compiler, when a loop of a source program includes a first array definition statement determining a value of an element of an array and an array use statement using the value of the element, by effecting the following processing of:

(a) executing the following steps for a pair of each array definition statement and each array use statement;

(a1) in the dataflow analysis processing 302, judging whether or not there exists a second array definition statement in a path of a program from said first array definition statement to said array use statement and whether or not the value defined by said first array definition is possibly changed by comparing subscripts of the array definition and the array use; and (a2) only if the possibility of the data change exists, generating array definition/use relationship data representing a definition/use relationship from said first array definition statement and said array use statement; and (b) in a program transformation processing 303 of the compiler, achieving a program transformation processing only when the array definition/use relationship data includes only a definition/use relationship of which a result of an execution of the program is not changed by the program transformation.

According to the method described above, even when a DO loop including a conditional statement like the program 401 is to be processed, the appropriate array definition/use relationships can be attained and consequently the vectorization can be accomplished.

That is, the program 401 is analyzed as follows. In the array definition/use relationship analysis processing 102, there are detected two paths from the array definition statement d3 to the array use statement u, namely, a path passing the THEN side of the conditional control structure including the statements from the statement 411 to the statement 412 and a path passing the ELSE side thereof. Here, if the subscripts of the array definition statements d3, d1, and d2 are compared with each other, it can be found that the subscripts become equal to each other when the loop is executed. Consequently, when the program is effected through either path, the value of data defined by the array definition statement d3 is changed or rewritten before the value reaches the array use statement u, namely, the original value does not reach the array use statement u. As a result, also after the completion of the array definition/use relationship analysis processing 102, the definition/use relationship data from the array definition statement d3 to the array use statement u is not generated and therefore the cyclic definition/use relationship does not appear.

Consequently, the program transformation processing 303 judges that the execution result of the program 401 does not change even when the program 401 is vectorized, and then the program 401 is subjected to a vectorization.

BRIEF DESCRIPTION OF THE DRAWINGS

The present invention will be apparent from the following detailed description taken in conjunction with the accompanying drawings in which:

FIGS. 1a, 1b, and 1c are flowcharts illustrating a program translation method according to the present invention in which FIG. 1a shows the overall configuration, FIG. 1b depicts the details of the loop independent dependence analysis, and FIG. 1c illustrates the details of the loop carried dependence analysis;

FIG. 8 is a schematic diagram illustrating the array definition/use relationship data, namely, the analysis results immediately after the completion of the array definition/use relationship analysis processing;

FIG. 9 is a schematic diagram showing a cyclic definition/use relationship of a variable or an array for which the vectorization associated therewith cannot be accomplished;

FIG. 10 is a diagram illustrating a soruce program corresponding to an object program obtained by effecting a transformation and a translation on the source program 401 according to the program translation method of the present invention, namely, a soruce program which can be vectorized by use of the conventional method.

DESCRIPTION OF THE PREFERRED EMBODIMENT

Figure 1A:
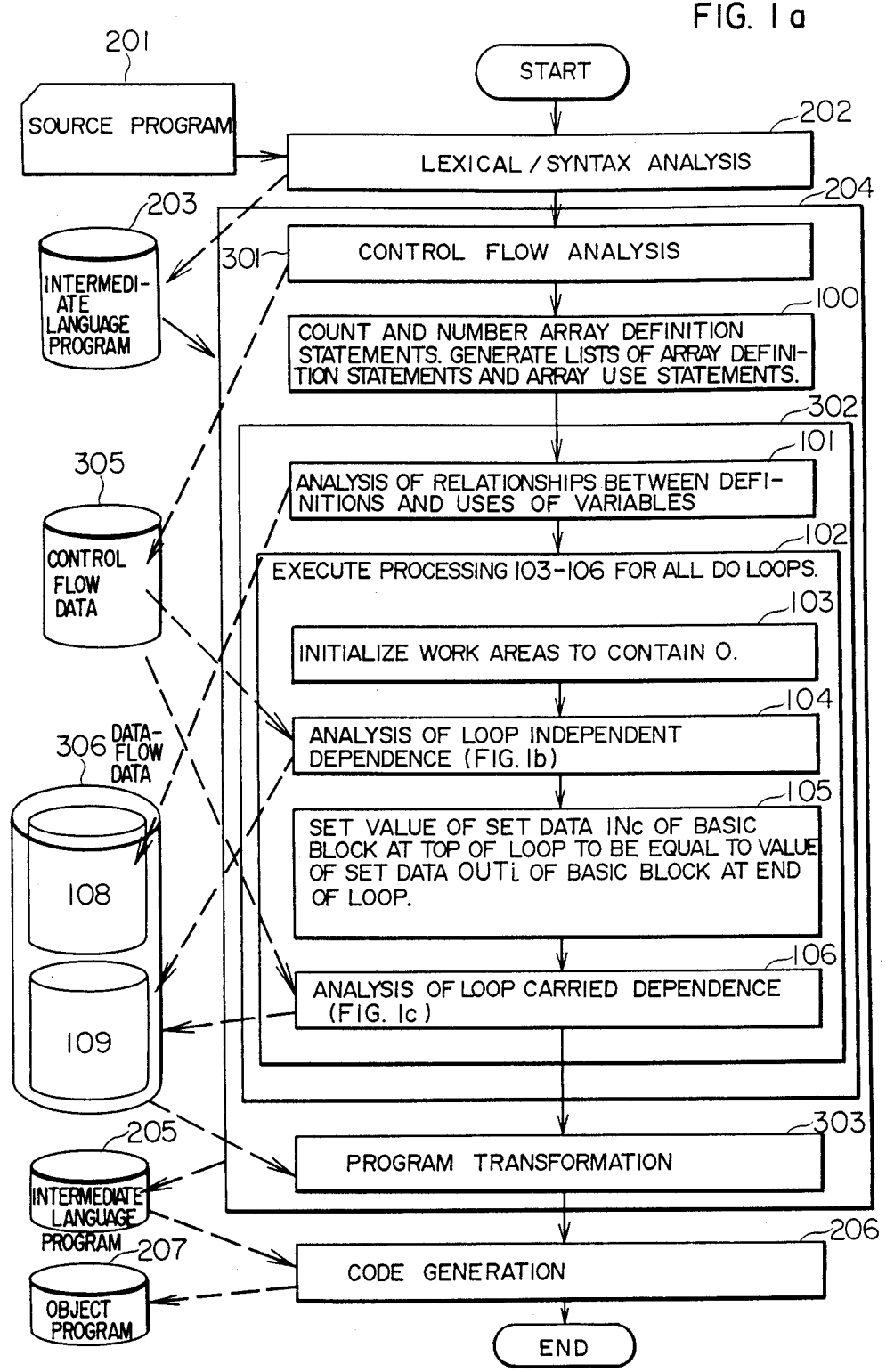

Referring now to FIGS. 1a-1c and 4-10, an embodiment will be described.

1. Outline of Processing

First, an outline of processing of a compiler in the embodiment will be described with reference to FIGS. 1a-1c. Like the processing described above, a source program 201 is subjected to lexical/syntax analysis so as to be translated into a first program 203 of an intermediate language suitable for the compiler processing (step 202) also in this embodiment. To increase the execution performance of the object program, an optimization is achieved on the first program 203 of the intermediate language so as to obtain a second program 205 of the intermediate language (step 204), which is different from the processqng of the prior art (to be described later). Thereafter, the second program of the intermediate language 205 is translated into an object program 207 executable in a computer (step 206).

The optimization processing 204 is accomplished as follows. First, a control flow analysis processing 301 is executed to obtain a control flow data 305 representing a sequence of an execution of each component of the intermediate language program 203. Next, a dataflow analysis processing 302 is achieved to obtain, by use of the control flow data 305, a dataflow data 306 representing definition/use relationships of variables and the like. Thereafter, a program transformation processing 303 is executed to transform, by use of the control flow data 305 and the dataflow data 306, the intermediate-language program 203 and outputs the intermediate language program 205 having an improved execution performance. These processing will be described in detail in the following paragraphs.

2. Control Flow Analysis Processing

First, the control flow analysis processing 301 will be described. This processing is executed to generate the control flow data 305 and is assumed to be achieved according to the method described in the reference (1).

Figures 4, 5:
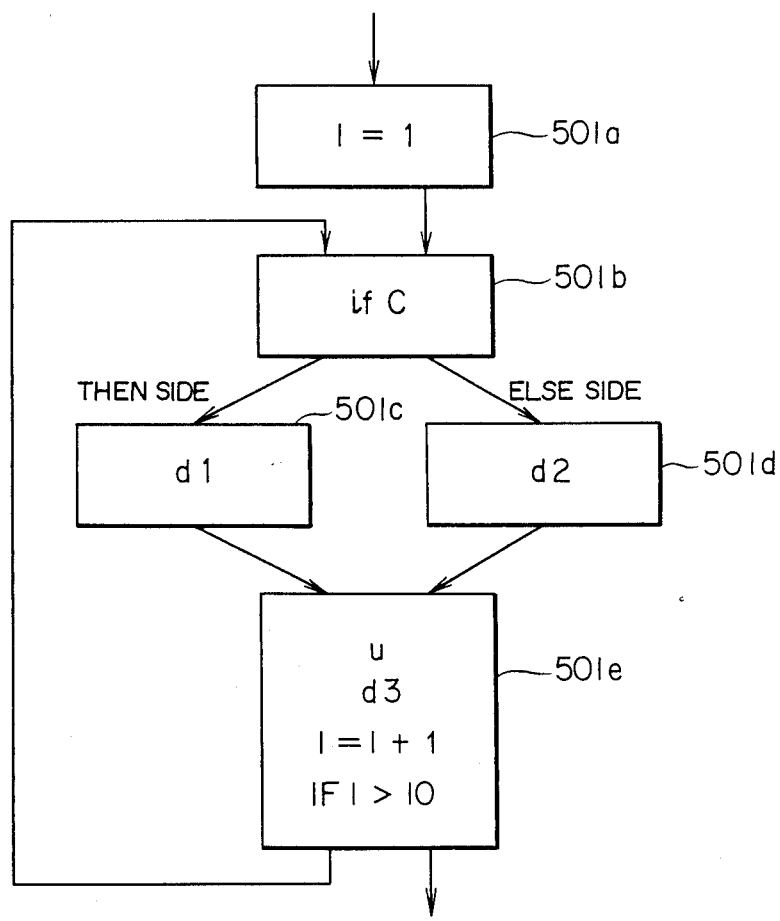
FIG. 4 is a flow diagram showing a FORTRAN program for explaining problems and an embodiment of the prior art method.
FIG. 5 is a schematic diagram illustrating a structure of a control flow data generated and used by the compiler optimization processing.

A description will be given of the control flow data 305. When the control flow analysis processing 301 is accomplished for the program 401 of FIG. 4, the control flow data 305 is obtained as indicated by 601a-601e in FIG. 6. The control flow data 305 will be described here with reference to FIG. 5 representing the data in an abstract fashion as a graph. Reference numeral 501a-501e indicate parts of the intermediate-language program 203 corresponding to the program 401 of FIG. 4. In the program sections 501a-501e, each statement is executed in a sequence described in the program. The program sections are referred to as basic blocks in general. The appropriate definition of the basic block is described in the reference (1). The sequence of execution between basic blocks is indicated by an arrow mark in FIG. 5.

Next, an intermediate-language program belonging to each basic block will be described. The basic block 501a includes a statement I=1 for assigning an initial value to a control variable I of the DO loop of the program 401. The basic block 501b comprises a portion which obtains a condition C to effect a judgment. The basic block 501c includes a portion associated with the THEN side of the conditional statement, namely, the array definition statement d1. In addition, the basic block 501d comprises a portion related to the ELSE side of the conditional statement, namely, the array definition statement d2. The basic block 501e includes an array use statement u, an array definition statement d3, an update statement I=I+1 to update the value of the control variable I for achieving the end processing of the DO loop, and a portion of IF I>10 to judge the end of the DO loop.

Figure 6:
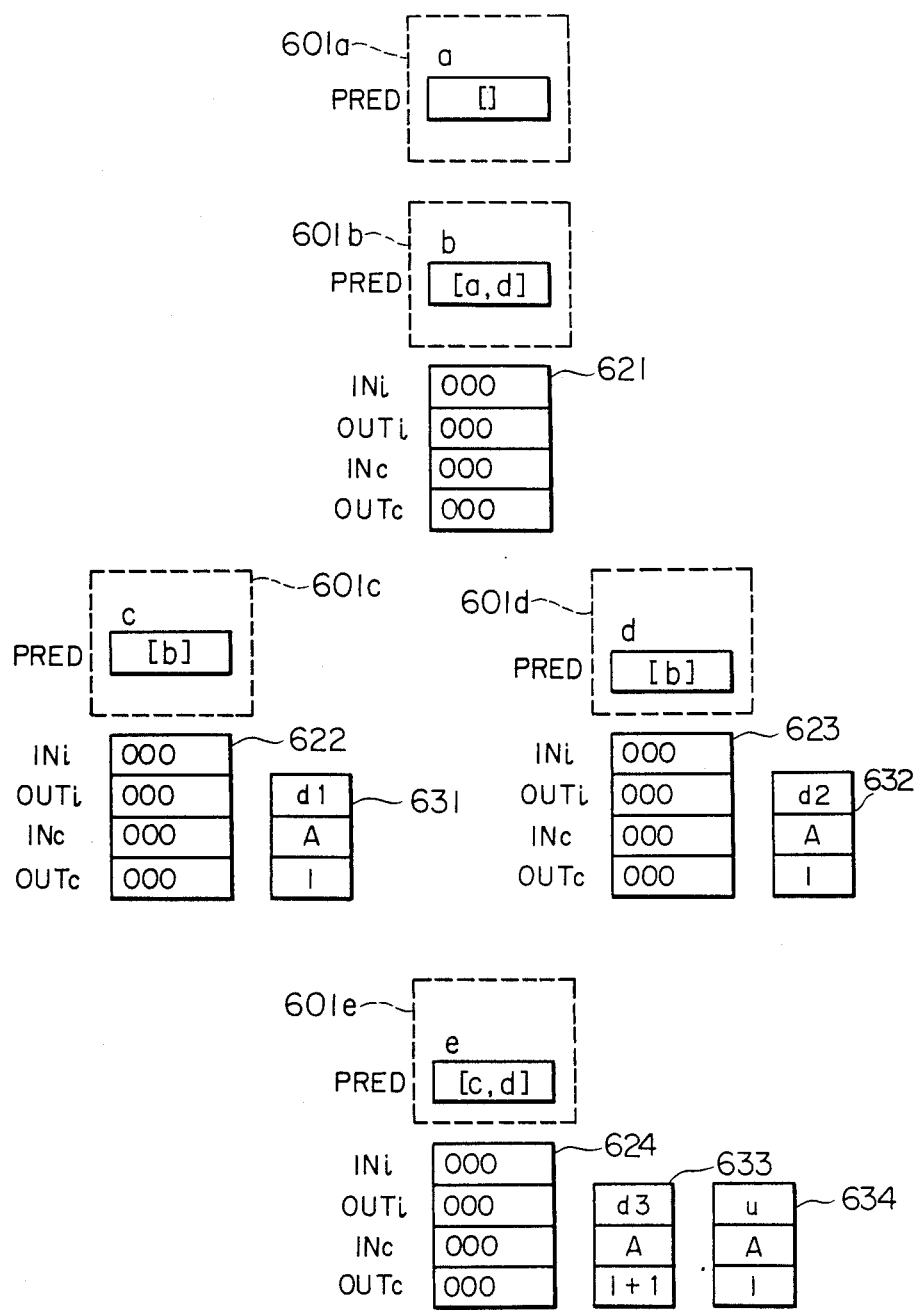
FIG. 6 is an explanatory diagram showing a control flow data immediately before the array definition/use relationship analysis processing and the data of intermediate results thereof.

Referring now to FIG. 6, a description will be given of the control flow data which is a representation in a computer of the result of the control flow analysis shown in FIG. 5. FIG. 6 is a schematic diagram illustrating the control flow data 305 immediately before the array definition/use relationship analysis processing 102 and the work areas 621-624 and 631-634 allocated corresponding thereto in the analysis processing 102. The tables 601a-601e represent the basic blocks 501a-501e, respectively.

These tables 601a-601e include list data of tables representing basic blocks which can be executed immediately before the respective basic blocks. The table 601a comprises an empty list data [ ]. Namely, this indicates that there does not exist a block executable immediately before the basic block 501b as shown in FIG. 5. The table 601b includes the list data [a, d] having as elements thereof address a of a table associated with the basic block 501a and address d of the table 601d associated with the basic block 501d. That is, as shown in FIG. 5, there exist two blocks, namely, the basic blocks 501a and 501d executable immediately before the basic block 501b. This is also the case with the tables 601c-601e.

The work areas 621-624 and 631-634 will be described in the description of the array definition/use relationship analysis processing 102.

3. Dataflow Analysis Processing

The dataflow analysis processing 302 mainly comprises two components as follows. The first component is the variable definition/use relationship analysis processing 101 to obtain the variable definition/use relationship data 108 representing the definition/use relationship of variables. The second component is the array definition/use relationship analysis processing 102 to obtain the array definition/use relationship data 109 representing the definition/use relationships of arrays. The dataflow data 306 is constituted from the variable definition/use relationship analysis processing 101 and the array definition/use relationship data 109.

First the variable definition/use relationship analysis processing 101 is executed according to the methods described in the references (1)-(2). The variable definition/use relationship data 108 resulted from the execution of the analysis processing 101 is of the same structure as that of the array definition/use relationship data 109. For the program 401, the variable definition/use relationship data 108 becomes as indicated by reference numeral 811 in FIG. 8. Namely, it is represented that there exists a definition/use relationships from a statement u using the value of a variable X to a statement d3 using the value of a variable X.

4. Preparative Processing for Array Definition/Use Relationship Analysis

The processing 100 and the processing 103 are executed as a preparation for the array definition/use relationship analysis processing 102. Description of these processings 100 and 103 follows.

First, in step 100 of FIG. 1a, the array definition statements appearing in the intermediate-language program 203 are counted and numbered. The numbering may be conducted in an arbitrary sequence. In the case of the program 401, the number of array definition statements is 3 and hence the array definition statements are numbered as 1, 2, and 3.

At the same time, corresponding to the tables 601a–601e representing the respective basic blocks, the processing generates array definition statement lists 631–633 associated with the array definition statements in the basic blocks and an array use statement list 634 associated with the array use statements in the basic blocks. A list 634 includes three elements, namely, an identifier indicating the statement, an array name, and a subscript. For the program 401, the tables 631–634 are generated as shown in FIG. 6.

The table 631 is generated corresponding to the table 601c and represents the array definition d1 in the basic block 501c. Consequently, the table 631 includes an identifier d1, an array name A, and a subscript I. The table 632 is generated corresponding to the table 601d and represents the array definition d2 in the basic block 501. The table 632 therefore comprises an identifier d2, an array name A, and a subscript I. The table 633 is generated corresponding to the table 601e and represents the array definition d3 in the basic block 501e. Consequently, the table 633 includes an identifier d3, an array name A, and a subscript I+1. The table 634 is generated corresponding to the table 601e and represents the array use u in the basic block 501e. The table 634 therefore comprises an identifier u, an array name A, and a subscript I.

As shown in FIG. 6, in the work area allocation processing 103, work areas including four elements INi, OUTi, INc, and OUTc having at least the number of bits equal to the number of the array definition statements are allocated corresponding to the control flow data 305, and then the initial values are set thereto. In the case of the program 401, the work areas 621–624 are allocated corresponding to the respective tables 601b–601e associated with the basic blocks in the DO loop in process, and then 0 is set to each bit to be used in the elements INi, OUTi, INc, and OUTc. When analyzing the program 401, at least three bits are allocated to each of these areas, and 0 is set to the three bits.

The work areas 621–624 respectively represent sets of array definition statements. In the case of the program 401, the first bit of the three bits indicates whether or not the array definition statement d1 numbered as 1 is an element of the set. Namely, if the bit is 1, the array definition statement d1 is an element of the set; otherwise, the statement d1 is not an element of the set. Similarly, the second bit indicates whether or not the array definition statement d2 numbered as 2 is an element of the set, and the last bit indicates whether or not the array definition statement d3 numbered as 3 is an element of the set.

5. Procedure 1 of Array Definition/Use Relationship Analysis

Next, the procedure of the array definition/use relationship analysis processing 102 will be described in detail with reference to FIG. 1. Although the program 401 is used as a program example, the description does not necessarily follow the flow of the processing of the program 401. The processing flow of the program 401 will be described in the final paragraphs of this description.

The array definition/use relationship analysis processing 102 receives as an input the control flow data 305 and outputs the array definition/use relationship data 109, which is a portion of the dataflow data 306. For the program 401, the array definition/use relationship data 109 is outputted as shown in FIG. 8. The array definition/use relationship data 109 is configured in a list structure and includes as elements thereof a table 802 indicating that the value of data defined by the array definition statement d1 is possibly used by the array use statement u and a table 803 indicating that the value of data defined by the array definition statement d2 is possibly used by the array use statement u.

The array definition/use relationship analysis processing 102 is effected as follows. First, the processing 104–106 is repetitiously executed for each DO loop of the intermediate-language program 203. The program 401 has only one DO loop, which need be subjected to the processing 104–106.

Figure 1B:
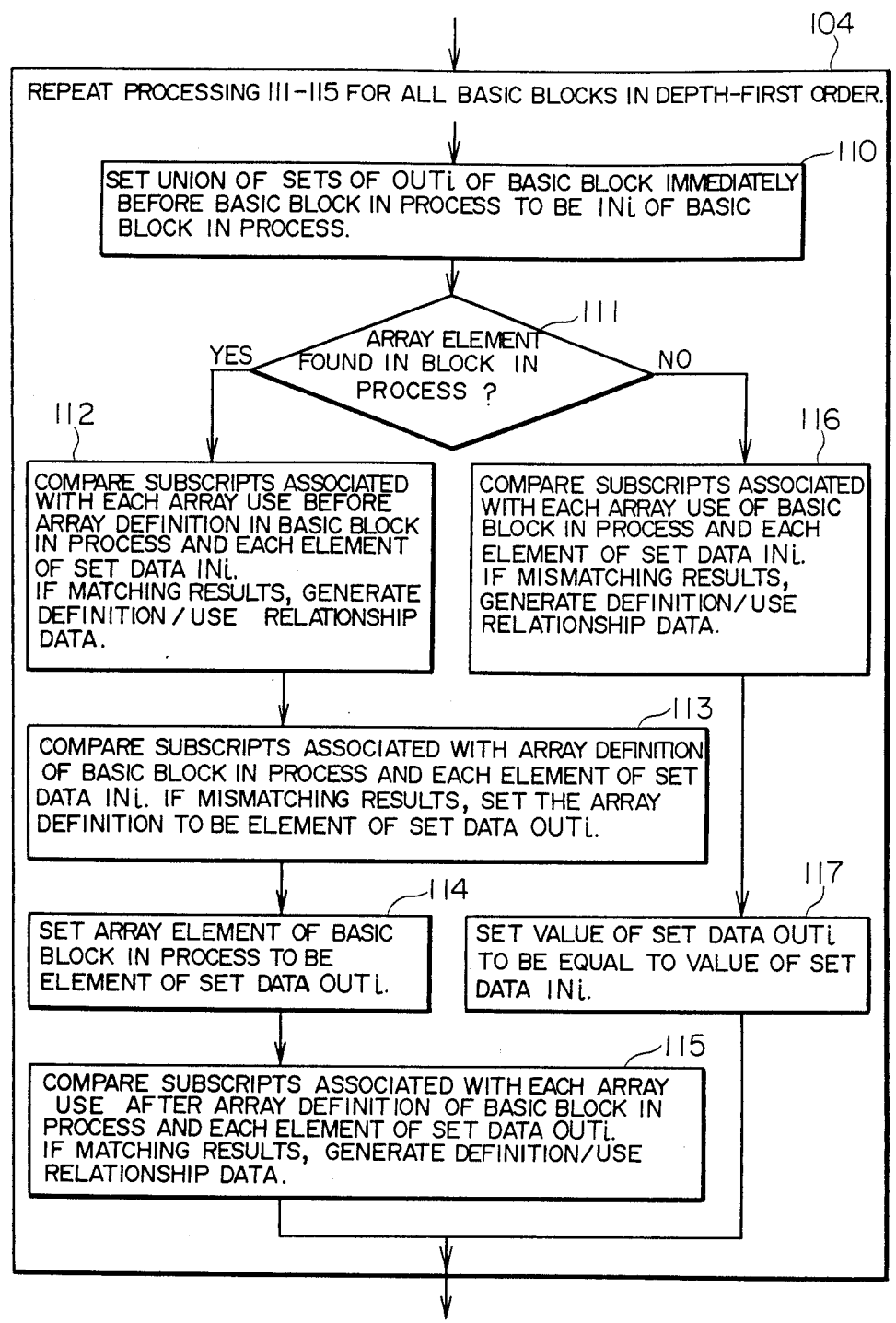

The loop independent dependence analysis processing 104 is accomplished as shown in FIG. 1b. That is, for all basic blocks of the DO loop in process, the processing 110–116 is repetitiously executed according to the priority of depth, namely, in the depth-first order. The definition of the term, depth-first order and the method for sorting the basic blocks in the depth-first order have been described in the reference (1). In the case of the program 401, the basic blocks are sorted in an order of 501a, 501b, 501c, 501d, and 501e.

The processing 110 is executed to calculate the set data INi. The set data INi corresponding to the basic block in process is assumed to comprise a sum of sets including the set data OUTi of each basic block immediately before the basic block in process, namely, the list data. More concretely, an OR operation is conducted for the respective bits. For example, in the case of the basic block 501c, only the block 501b is the basic block immediately before the basic block 501c; consequently, the set data INi of the table 601c is set to be equal to the set data OUTi of the table 601b. Moreover, in the case of the basic block 501e, there exist two basic blocks 501c and 501d immediately before the basic block 501e, and hence the sum of sets between the set data OUTi of the table 601c and the set data OUTi of the table 601d is set as the value of the set data OUTi of the table 601e.

The processing 111 is used to judge whether or not an array definition statement is included in the basic block in process. Namely, it is checked whether or not the basic block in process includes a list of array definition statements corresponding thereto. For each basic block in the DO loop of the program 401, the basic block 501b does not include an array definition statement. This can be recognized from a fact that the table 601b does not include a list of array definition statements corresponding thereto. The basic block 501c–501e each include an array definition statement, which can be determined from a fact that there exist the array definition statement lists 631–633 corresponding to the tables 601c–601e, respectively. When the array definition statements are included, the processing 112–115 is executed; otherwise, the processing 116–117 is accomplished.

If the array definition statements are included, the processing is effected as follows. First of all, the processing 112 is achieved. Namely, the subscripts are compared between each array use before the array definition statement in the basic block in process and each element of the set data INi. If matching results, the array definition/use relationship data 109 is generated.

In the case of the basic blocks 501c and 501d, there does not exist any array use before the array definition statements d1 and d2, respectively, and hence the comparison is not actually conducted and the array definition/use relationship data 109 is not generated.

Figure 7:
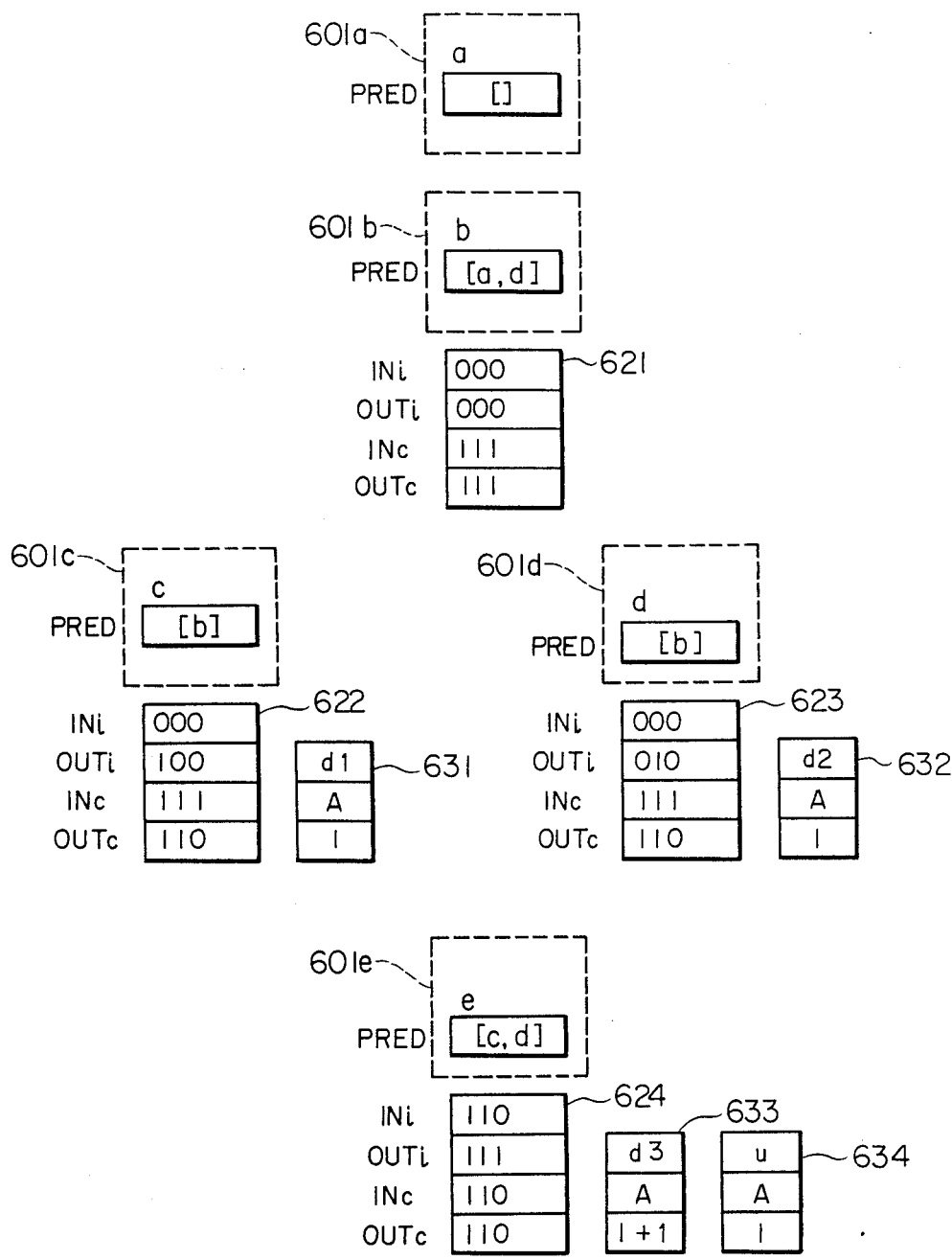
FIG. 7 is an explanatory diagram illustrating a control flow data after the completion of the array definition/use relationship analysis processing and the intermediate results thereof.

In the case of the basic block 501e, an array use statement u exists before the array definition statement d3. This can be recognized from a fact that there exists an array use statement list 633 corresponding to the table 601e. For the set data INi of the table 601e, as shown in FIG. 7, the first two bits are 1's namely, the array definition statments d1–d2 are the elements thereof; consequently a comparison is effected for a subscript I appearing in the array use statement u, a subscript I (included as the third element of the table 634) appearing in the array definition statement d1, and a subscript I (included as the third element of the table 632) appearing in the array definition statement d2 so as to determine whether or not these values are equal to each other.

Since the results of the compare operations are true (i.e. the values are equal to each other), a portion of the array definition/use relationship data 109 is generated. That is, a table 802 is generated as a result of the first comparison. The table 802 indicates that there exists a definition/use relationship from the array definition statement d1 to the array use statement u. The second comparison causes to generate a table 803, which indicates an existence of a definition/use relationship from the array definition statement d2 to the array use statement u.

Thereafter, the processing 113 is accomplished. Namely, a subscript comparison processing is executed between each array definition in the basic block in process and each element of the set data INi. If mismatching results, the array definition statement is set to be an element of the set data OUTi. In the case of the basic blocks 501c–501d, the elements INi of the table 601c–601d constitute an empty set, the comparison is not actually achieved and hence the elements OUTi of the tables 601c–601d still constitute an empty set.

The processing 114 is then executed, namely, each array definition statement of the basic block in process is set to be an element of the set data OUTi. In the case of the basic block 501c, the array definition statement d1 is set to be an element of the set data OUTi constituting the table 601c. That is, the first bit of OUTi is set to 1. Similarly, in the cases of the basic blocks 501d–501e, the array definition statements d2–d3 are respectively set to be elements of the set data OUTi constituting the tables 601d and 601e.

When the array definition statements are included, the final processing 115 is accomplished as follows. The subscripts are compared between each array use after the array definition statements of the basic block in process and each element of the set data OUTi. If matching results, the array definition/use relationship data 109 is generated. In the cases of the basic blocks 501c–501e, there does not exist an array use after the array definition statements d1, d2, and d3, respectively; consequently, the comparison is not actually effected and hence the array definition/use relationship data 109 is not generated.

When the array definition statements are not included, the processing is achieved as follows. First, the processing 116 is executed, namely, the subscript of each array use in the basic block in process is compared with the subscript of each element of the set data INi. If matching results, the array definition/use relationship data 109 is generated. In the case of the basic block 501b, an array use is not included, and hence the comparison is not achieved and the array definition/use relationship data 109 is not generated.

Thereafter, the processing 117 is executed, namely, the value of the set data INi of the table corresponding to the basic in process is set to be the value of the set data OUTi of the table.

6. Procedure 2 of Array Definition/Use Relationship Analysis

When the loop independent dependence analysis processing 104 is finished, the loop carried dependence analysis preprocessing 105 is achieved as shown in FIG. 1a. In this processing 105, the value of the set data INc of the basic blocks at the top of the loop is set to be equal to the value of the set data OUTi of the basic block at the end of the loop. Thereafter, the loop carried dependence analysis processing 106 is accomplished.

Figure 1C:
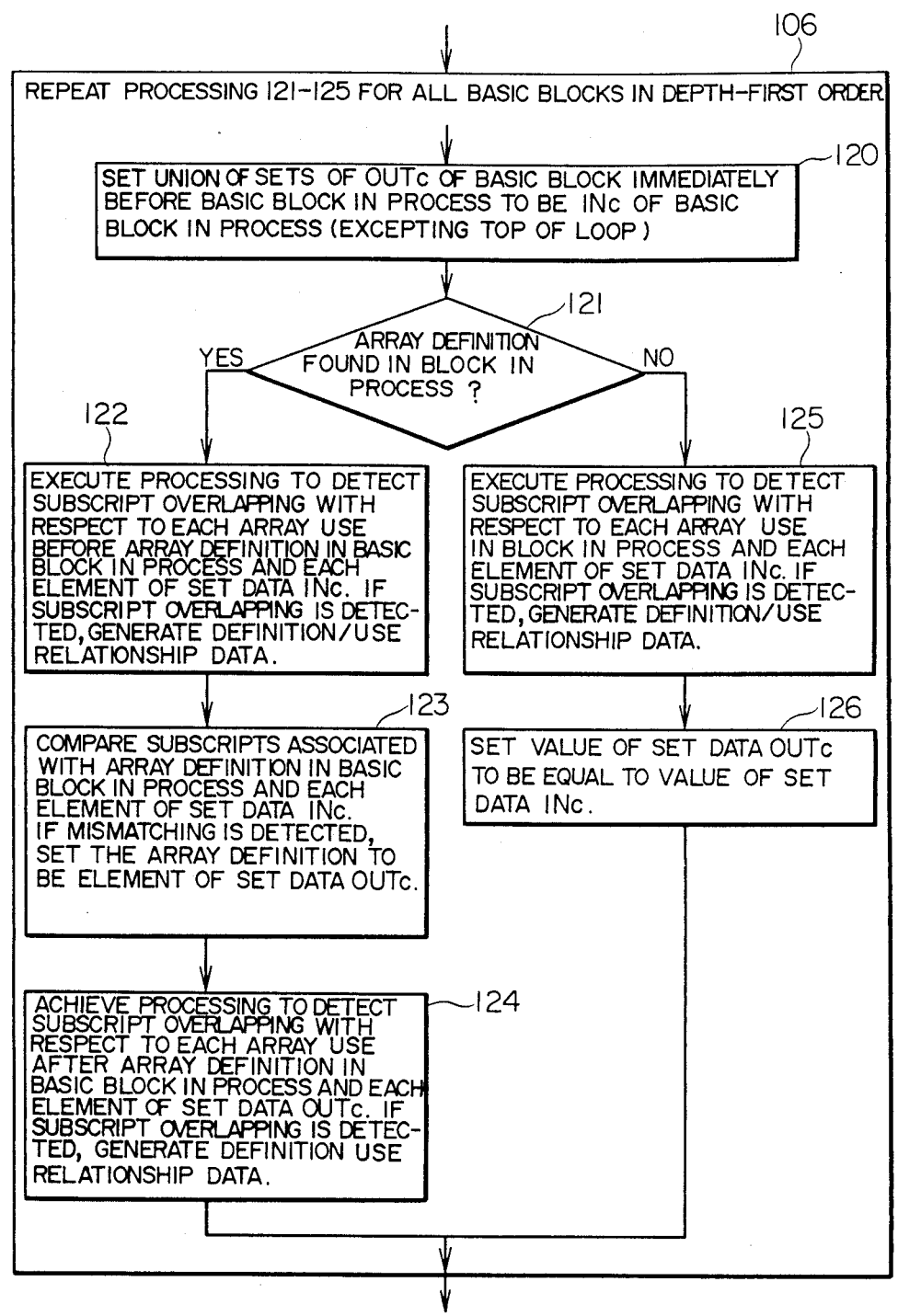
Figure 2:
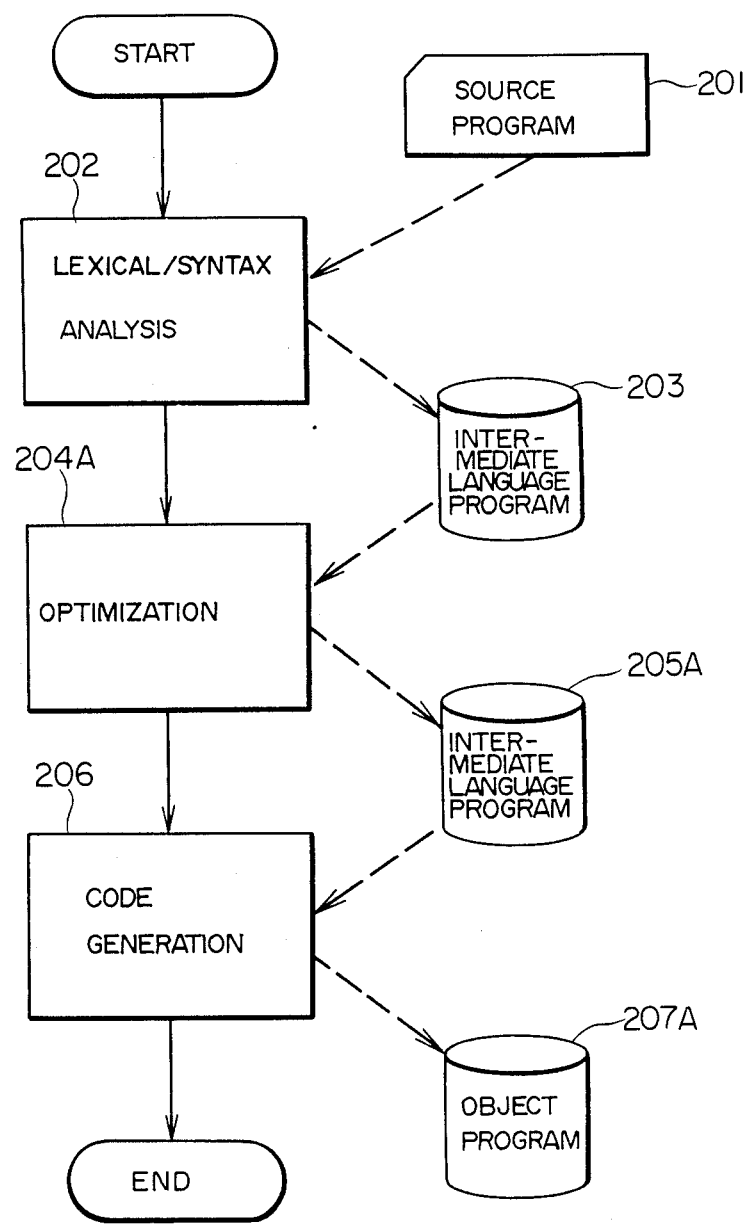
FIG. 2 is a flow diagram illustrating an outline of the processing of a FORTRAN compiler.
Figure 3:
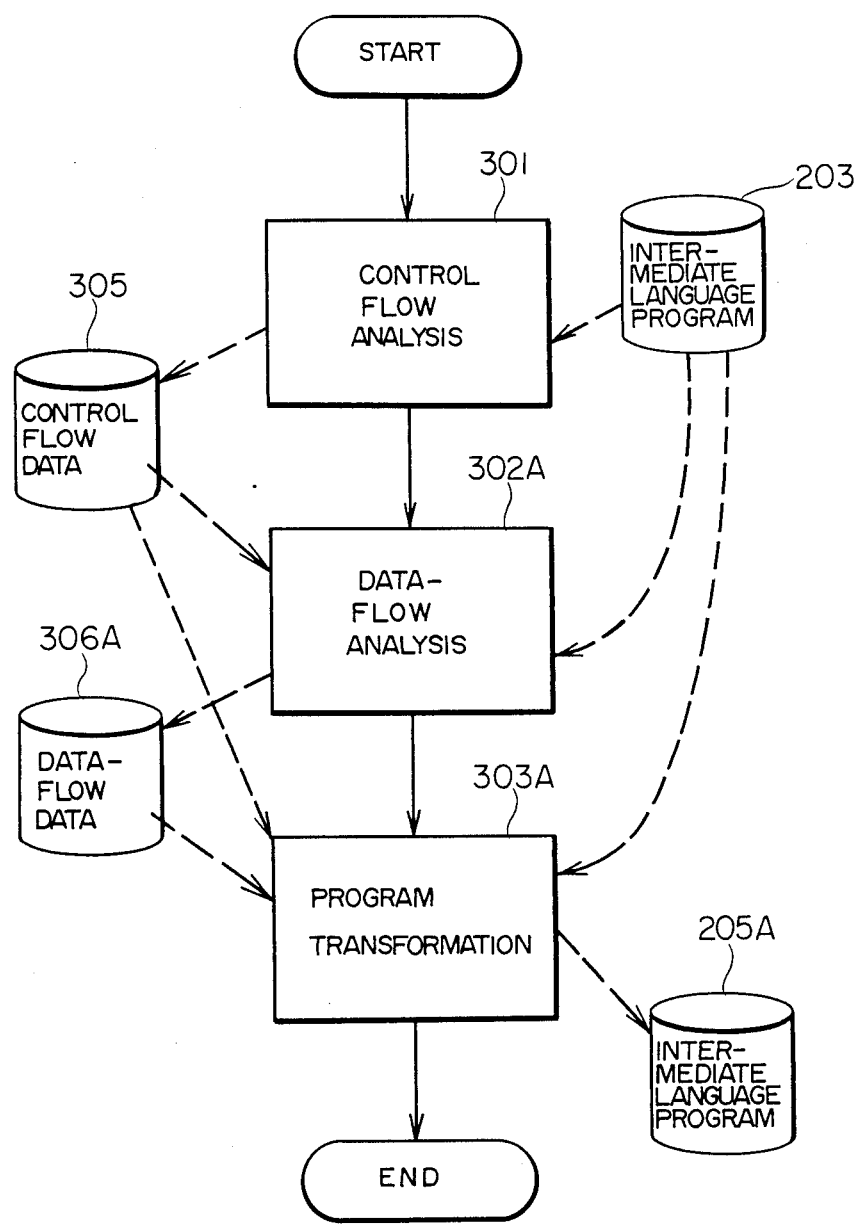
FIG. 3 is a flow diagram illustrating an outline of the optimization processing of FIG. 2.

The processing 106 is executed as shown in FIG. 1c. That is, the processing 120–126 is repetitiously achieved for all basic blocks of the DO loop in process in the depth-first sequence.

The processing 120 is used to calculate the set data INc. The set data INi corresponding to the basic block in process is assumed to comprise the sum of sets of the set data OUTc of each basic block immediately before basic block in process. More concretely, an OR operation is effected for each bit of the set data OUTc of the table corresponding to the basic block in process. However, if the basic block in process is the basic block at the top of the loop, the setting of INc has already been completed, and hence this processing is not executed. Namely, in the case of the program 401, this processing is not accomplished for the basic block 501b.

The processing 121 is achieved to judge whether or not an array definition statement is included in the basic block in process. For each block of the program 401, the result of the judgment is identical to the judgment result obtained by the processing 111. If an array definition statement is included, the processing 122–124 is executed; otherwise, the processing 125 is accomplished.

When an array definition statement is included, the processing is achieved as follows. First, the processing 122 is executed, namely, the subscript overlapping detection processing is accomplished on each array use before the array definition statement of the basic block in process and each element of the set data INc. If the subscript overlapping is detected, the array definition/use relationship data 109 is generated. Here, the subscript overlapping detection processing is achieved to judge whether or not two subscripts can take the same value in the iteration of the loop. If this is the case, the judgment results in the presence of the overlapping; otherwise, the judgment results in the absence thereof. The method of the judgment is effected as described in detail in the reference (2).

In the cases of the basic blocks 501c-501d, an array use does not exist before the array definition statement; as a result, the processing above is not actually executed.

In the case of the basic block 501e, the set data INc includes the array definition statements d1-d2, and hence the subscript overlapping detection processing is accomplished on the subscripts I's appearing in the array definition statements d1-d2 and the subscript of the array definition statement d3 of the basic block 501e. The subscript of the array definition statement d1 is obtained from the third element of the table 631, whereas the subscript of the array definition statement d2 is attained from the third element of the table 632. Since the subscript I+1 does not take the value of the subscript I in the subsequent iteration of the DO loop, the overlapping is judged absent.

Thereafter, the processing 123 is achieved, namely, the value of the subscript of the array definition in the basic block in process is subjected to a loop processing and then the resultant value is compared with the subscript of each element of the set data INi. If mismatching results, the array definition statement is set to be an element of the set data OUTc.

In the case of the basic block 501c, the value of the set data INc in the table 622 is a bit sequence of 111, which indicates that the array definition statements are included as elements of the set. The result of the subscript I of the array definition statement d1 in the basic block 501c undergone a loop processing, namely, the subscript I+1 is compared with the subscripts I, I, and I+1 of the array definition statements d1, d2, and d3, respectively. In these three comparisons, only the result of the last comparison is true. As a consequence, the value of the set data OUTc becomes to be a bit sequence of 110 in the table 622. Namely, the array definition statement d3 is not included in the set data OUTc.

The case of the basic block 501d is similar to that of the basic block 501c. As a result of the processing, the set data OUTc in the table 601d includes the array definition statements d1-d2.

Next, the processing 124 is accomplished, namely, the subscript overlapping detection processing is effected for the subscript of each array use after the definition statement in the basic block in process and each element of the set data INc. If the subscript overlapping is detected, the array definition/use relationship data 109 is generated. In the program 401, there does not exist an array use statement after the array definition statement in any basic block, and consequently this processing is not actually executed.

When the array definition statement is not included, the processing is accomplished as follows. First, the processing 125 is executed, namely, the subscript overlapping detection processing is achieved for the subscript of each array use in the basic block in process and the subscript of each element of the set data INc. If the subscript overlapping is detected, the array definition-/use relationship data 109 is generated. In the case of the basic block 501b, an array use is not included, and consequently this processing is not accomplished and the array definition/use relationship data 109 is not generated.

Next, the processing 126 is achieved, namely, the value of the set data INc of the table corresponding to the basic block in process is set to be the value of the set data OUTc of the table.

7. Array Definition/Use Relationship Analysis on Program 401

Finally, the array definition/use relationship analysis processing 102 of the program 401 will be described along the processing flow by use of FIGS. 6-8. FIG. 6 shows the control flow data 305 including tables 601a-601e before the starting of the array definition/use relationship analysis processing 102 and the work areas 621-624 and 631-634 allocated to the processing 102. These work areas have been subjected to the initialization processing 103.

First, the loop independent dependence analysis processing 104 is executed. The basic block 501b is then processed to set the set data INi and OUTi in the table 621. However, the basic block 501b does not include an array definition statement, and thus the bits are kept to be 0 as shown in FIG. 7.

Secondly, the basic block 501c is processed to set the set data INi and OUTi in the table 622. Although the value of the set data INi in the table 622 is equal to the value of the set data OUTi in the table 621 and the bit sequence is 000, an array definition statement d1 exists in the basic block 501c; consequently, the value of the first bit of the set data OUTi is set to 1 in the table 622.

Thirdly, the basic block 501d is processed to set the set data INi and OUTi in the table 623. The value of the set data INi in the table 623 is identical to the value of the set data OUTi in the table 621 and the bit sequence is 000; however, an array definition statement d2 exists in the basic block 501d, and therefore the value of the second bit of the set data OUTi is set to 1 in the table 623.

Fourthly, the basic block 501e is processed to set the set data INi and OUTi in the table 624. The value of the set data INi in the table 624 is the sum of sets, namely, the value of the set data OUTi in the table 622 and the value of the set data OUTi in the table 623, and hence the bit sequence is set to 110. Since the basic block 501e includes an array definition statement d3, the value of the set data OUTi is set to 111 in the table 624. In the processing 112 for the basic block 501e, tables 802-803 are generated as a portion of the array definition/use relationship data 109.

Next, the loop carried dependence analysis proprocessing 105 is effected to set the value of the set data INc in the table 601b corresponding to the basic block 501b at the top of the loop. Since the value of the set data OUTi in the table 624 corresponding to the basic block 601e at the end of the loop is 111, the value of the set data INc is also set to a bit series 111 in the table 621.

Thereafter, the loop carried dependence analysis processing 106 is executed. The basic block 501b is first processed to set the set data OUTc in the table 621. Since the basic block 501b does not include an array definition statement, the set data OUTc becomes to be equal to the set data INc and the bit sequence is set to 111.

Secondly, the basic block 501c is processed to set the data INc and OUTc in the table 622. Although the value of the set data INc in the table 622 is equal to the value of the set data OUTc in the table 601b and the bit sequence is 111, there exists an array definition statement d1 and the third bit is held to be 0 in the processing 123, consequently, the value of the set data OUTc is set to a bit sequence 110 in the table 622.

Thirdly, the basic block 501d is processed to set the set data INc and OUTc in the table 623. The value of the set data INc in the table 623 is identical to the value of the set data OUTc in the table 601b and the bit sequence is 111. However, there exists an array definition statement d2 and the third bit is held to be 0 in the processing 123; consequently, the value of the set data OUTc becomes to be a bit sequence 110 in the table 623.

Fourthly, the basic block 501e is processed to set the set data INc and OUTc in the table 624. Since the value of the set data INc in the table 624 in the sum of sets, namely, the value of the set data OUTc in the table 622 and the value of the set data OUTc in the table 623, the bit sequence becomes to be 110. The processing 123 sets the value of the set data INc to be equal to the value of the set data OUTc, and hence the value of the set data OUTi is set to a bit sequence 110 in the table 624.

8. Description of Program Transformation Processing

In this embodiment, a vectorization is accomplished as the program transformation processing. The method of the vectorization has been described in the references (2)–(3) noted already. Since the vectorization can be executed only when there does not exist a definition/use relationship of a variable or an array not suitable for the vectorization, the condition is judged prior to the vectorization.

As already described, in the case of the program 401, the relationship between the array definition statement d3 and the array use statement u may possibly cause a problem in the judgment to determine whether or not the vectorization is to be accomplished. Namely, if the value of the data defined by the array definition statement d3 is used in the array use statement u, the relationship therebetween is not suitable for the vectorization. However, the value of the data defined by the array definition statement is rewritten or changed by the array definition statements d1–d2, and hence the value is not possibly used by the array use statement u. In the program 401, therefore, the cyclic definition/use relationship like that shown in FIG. 9 does not exist in this program, and hence there does not exist a definition/use relationship unsuitable for the vetorization. Consequently, the intermediate-language program associated with the program 401 can be transformed into a program executable in a supercomputer according to the method of the references (2) and (3).

An object program outputted as a result of the transformation processing corresponds to the source program 1001 shown in FIG. 10. Namely, the obtained program corresponds to an object program resulting from a translation conducted on the source program 1001 according to the conventional program translation method.

The program 1001 will be described in the following paragraphs. The portion of the program 100 preceding the statement d3 is identical to the program 401. Since the definition/use relationship from the array definition statement d3 to the array use statement u is not included in the array definition/use relationship data 109, there does not exist an array definition/use relationship having a direction opposite to the direction of description of the program. In the program 1001, namely, each statement of the program 401 is arranged in the description order. Among the array elements defined by the array definition statement d3, the elements other than A(11) is rewritten by the array definition statement d1 or d2, and hence only the definition of A(11) is kept remained.

According to the present invention, the appropriate array definition/use relationships can be attained also for a DO loop including a condition statement or a similar control structure like in the case of the program 401, the optimization such as a vectorization becomes possible, which enables to obtain an object program having a higher performance.

While the present invention has been described with reference to the particular illustrative embodiment, it is not restricted by the embodiment but only by the appended claims. It is to be appreciated that those skilled in the art can change or modify the embodiment without departing from the scope and spirit of the present invention.

We claim:

1. A program translation method in a compiler for translating a source program into an object program through a sequence of the following processing of:

(A) analyzing a lexical/syntax of the source program and then transforming the source program into a first program of an intermediate language suitable for a processing of the compiler; then and (B1) analyzing an order of execution of portions constituting the first program of the intermediate language and for obtaining control flow data representing a flow of an execution sequence; then and (B2) by using the control flow data, obtaining dataflow data representing definition/use relationships of variables and arrays appearing in the first program of the intermediate language; then and (B3) based on the dataflow data, transforming the first program of the intermediate language and then outputting a second program of the intermediate language having a higher execution performance; and then (C) converting the second intermediate-language program into an object program executable in a computer;

wherein if a loop of the source program contains a first array definition statement determining a value of an array and an array use statement using the value of the array, the following steps are effected for a pair of said each array definition statement and said each array use statement in the loop:

(a)(a1) judging whether or not a second array definition statement exists in a path from the first array definition statement to the first array use statement in the (B2) and whether or not the second array definition statement possibly rewrites the value of the array defined by the first array definition statement by comparing subscripts associated with the array definition and the array use, respectively; and then (a2) only if a possibility of a rewriting is present, generating array definition/use relationship data representing a definition/use relationship from the first array definition statement to the first array use statement, and then (b) only if the array definition/use relationship data includes only a definition/use relationship for which a result of a program execution is not changed by a transformation of the program, effecting a program transformation processing.

2. A program translation method in a compiler for translating a source program into an object program through a sequence of the following processing of:
   (A) analyzing a lexical/syntax of the source program and then transforming the source program into a first program of an intermediate language suitable for a processing of the compiler; and then
   (B1) analyzing an order of execution of portions constituting the first program of the intermediate language and for obtaining control flow data representing a flow of an execution sequence; and then
   (B2) by using the control flow data, obtaining dataflow data representing definition/use relationships of variables and arrays appearing in the first program of the intermediate language; and then
   (B3) based on the dataflow data, transforming the first program of the intermediate language and then outputting a second program of the intermediate language having a higher execution performance; and then
   (C) converting the second intermediate-language program into an object program executable in a computer;

wherein if a loop of the source program contains a first array definition statement determining a value of an array and an array use statement using the value of the array, the following steps are effected:
   (a) in the (B2), for each loop of the source program,
   (a1) judging whether or not subscripts of array references are equal to each other through a repetition of an execution of the loop, thereby obtaining array definition/use relationship data representing a definition/use relationship appearing during the repetition of the loop; and then
   (a2) judging whether or not the subscripts of the array references take a same value, thereby obtaining array definition/use relationship data representing a definition/use relationship appearing in another repetition of the loop, and then
   (b) in the (B3), judging whether or not the array definition/use relationship data contains only a definition/use relationship for which a result of a program execution is not changed by a transformation of the program, and effecting a program transformation processing only when the judgment result is true.

* * * * *